(12) United States Patent
Blacquiere

(10) Patent No.: US 7,420,902 B2
(45) Date of Patent: Sep. 2, 2008

(54) DEVICE AND METHOD FOR RECORDING INFORMATION

(75) Inventor: Johannis Friso Rendert Blacquiere, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 689 days.

(21) Appl. No.: 10/513,944

(22) PCT Filed: Apr. 22, 2003

(86) PCT No.: PCT/IB03/01705

§ 371 (c)(1),
(2), (4) Date: Nov. 9, 2004

(87) PCT Pub. No.: WO03/096338

PCT Pub. Date: Nov. 20, 2003

(65) Prior Publication Data

US 2005/0244140 A1    Nov. 3, 2005

(30) Foreign Application Priority Data

May 14, 2002    (EP)    .................................... 02076902

(51) Int. Cl.
*G11B 20/18*    (2006.01)

(52) U.S. Cl. .................. 369/53.17; 369/47.14; 386/95; 386/113; 386/126; 714/710

(58) Field of Classification Search .................. 386/46, 386/95, 96, 104, 112–116, 125, 126, 53.17, 386/58; 369/32, 47.14; 360/53; 714/710
See application file for complete search history.

(56) References Cited

U.S. PATENT DOCUMENTS 6,314,235 B1 *    11/2001    Gotoh et al. ................... 386/95
6,336,196 B1 *    1/2002    Sasaki et al. ................. 714/710

FOREIGN PATENT DOCUMENTS

JP    08237606    9/1996

* cited by examiner

*Primary Examiner*—Thai Tran
*Assistant Examiner*—Mishawn Dunn
(74) *Attorney, Agent, or Firm*—Edward W. Goodman

(57) ABSTRACT

A device for recording digitally encoded video information records video segments and playback information for controlling the playback of the segments. The device has an error detection unit (32) for detecting recording errors, and a bridging unit for creating a bridge segment in the event of a detected recording error. The bridge segment (360,460) replaces the recorded video between an exit point in a segment before the detected recording error and an entry point in a segment after the recording error. The bridge segment (360, 460) is recorded in a location in the track different from a location of the detected recording error. Further bridging playback information is recorded for controlling in playback mode to reproduce the encoded video up to the exit point via the bridge segment and continuing at the entry point.

11 Claims, 3 Drawing Sheets

Figure 3:
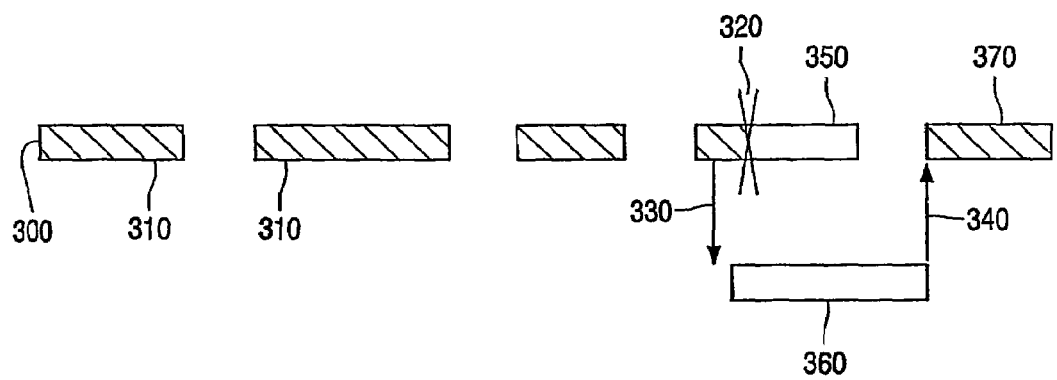

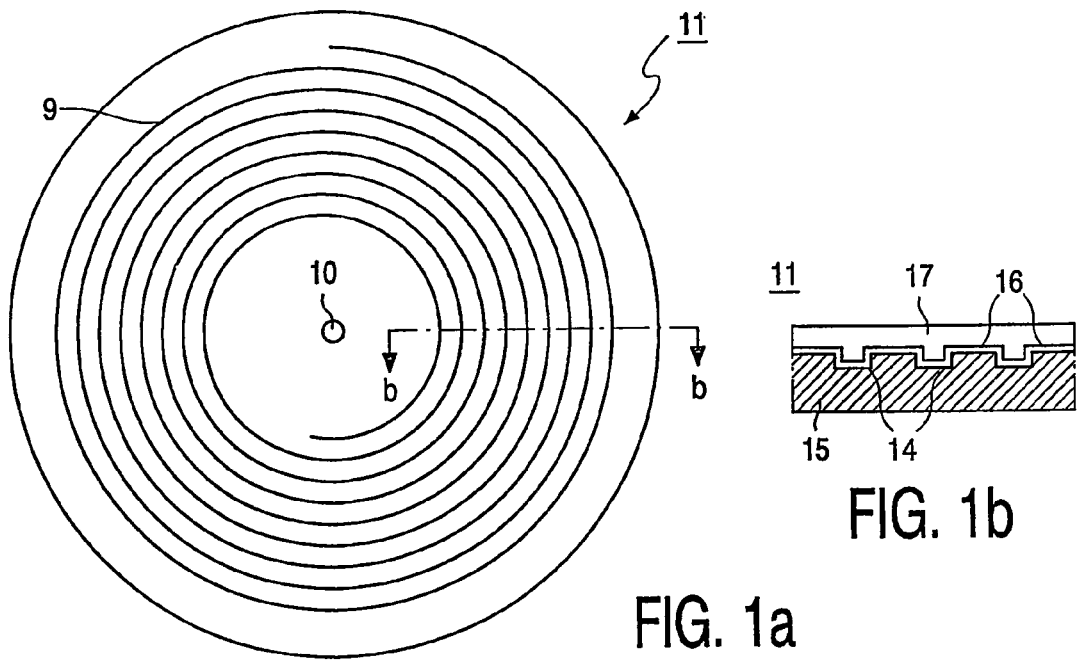
FIG. 1b
FIG. 1a
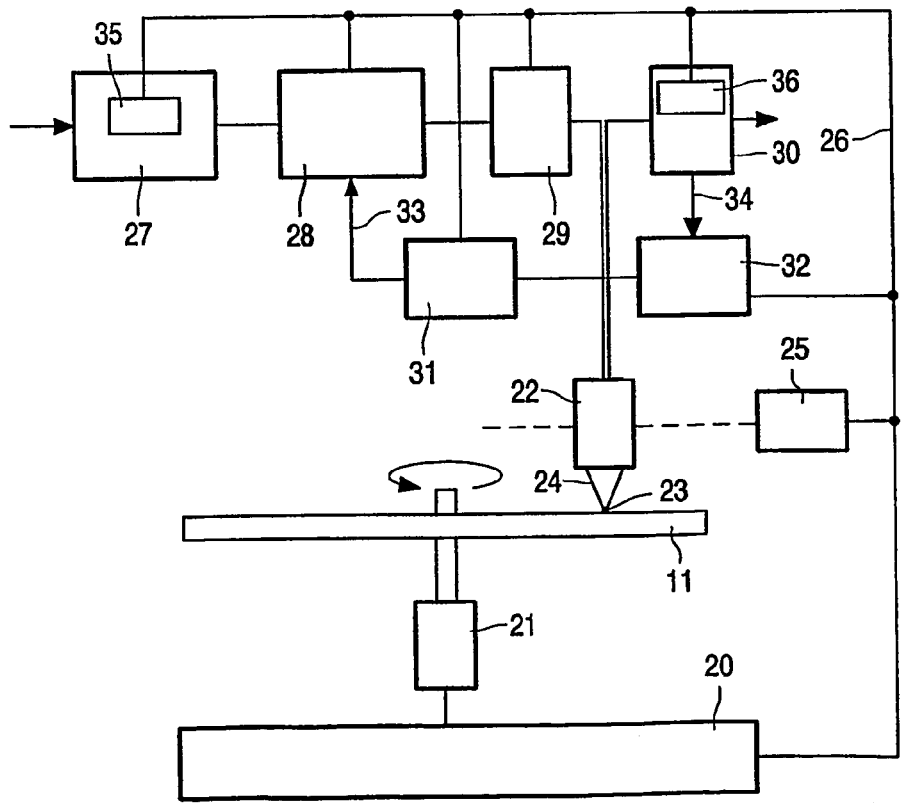
FIG. 2

DEVICE AND METHOD FOR RECORDING INFORMATION

The invention relates to a device for recording information in a track in a recordable area on a record carrier, which device comprises recording means for recording marks representing the information The invention further relates to a method of recording information, which method comprises recording marks representing the information in a track in a recordable area on a record carrier.

The invention further relates to a computer program product for recording information.

A device and method for recording information on a record carrier is the known video CD system, in which digitally compressed video data is recorded on an optical disc according to the MPEG format A Video CD player is known from JP 08237606. During reading the digital image information and decoding the information defects of the read-out signal of the compressed digital image data are detected. A correction unit is provided for supplying correction image data to compensate the absence of image data due to a detected defect. The correction image data is included in the stream of video data to be displayed. The known system has the problem that the correction image data can be insufficient for hiding the detected error. Also more complicated types of errors, e.g. occurring in a system for recording video information in a consumer environment, cannot be easily hidden by supplying correction data.

It is an object of the invention to provide a system for recording and reproducing digitally compressed video information, which is able to hide errors in a more flexible way.

For this purpose, the device as described in the opening paragraph has control means for controlling recording of digitally encoded video information in segments in the track and of playback information for controlling the playback of the segments, which control means comprise error detection means for detecting recording errors, and bridging means for creating, in the event of a detected recording error, a bridge segment replacing the recorded video between an exit point in a segment before the detected recording error and an entry point in a segment after the recording error, and for recording bridging playback information for controlling to reproduce the encoded video up to the exit point via the bridge segment and continuing at the entry point, and for recording the bridge segment in a location in the track different from a location of the detected recording error. The method as described in the opening paragraph is characterized in that the method comprises controlling recording of digitally encoded video information in segments in the track and of playback information for controlling the playback of the segments, detecting recording errors, creating, in the event of a detected recording error, a bridge segment replacing the recorded video between an exit point in a segment before the detected recording error and an entry point in a segment after the recording error, recording bridging playback information for controlling to reproduce the encoded video up to the exit point via the bridge segment and continuing at the entry point, and recording the bridge segment in a location in the track different from a location of the detected recording error. The measures have the advantage that recording errors, once detected, can be compensated by creating a new valid video data stream by including the bridge segment in the stream while preventing reading of the erroneous location during subsequent reproduction of the video from the record carrier. Hence during such subsequent reproduction the error can be completely circumvented, because using the bridge segment the part of the video stream containing the error is no longer needed. In addition more complicated types of errors, which might result in a decoder reset, undefined audio and/or video data elements leading to visible or audible artifacts, can be eliminated by generating the bridge segment according to normal real time data storage and allocation requirements.

In an embodiment of the device the error detection means comprise means for detecting a physical error during writing the information. This has the advantage that the bridge segment and its corresponding control information is recorded immediately during the recording process of the video information, and hence there will be no error in the reproduced signal even when the video is played back for the first time.

In an embodiment of the device the error detection means comprise means for detecting logical errors in the digitally encoded video information, in particular discontinuities in time indicators included in a continuous stream of digitally encoded video information. The logical errors can for example be detected in the input video stream. This has the advantage, that the bridge segment can be constituted immediately while the original video up to or containing the erroneous part is recorded.

Figure 4:
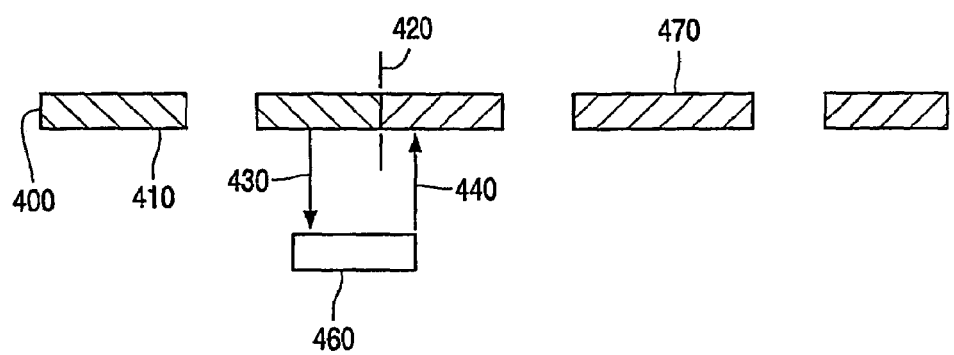
Figure 5:
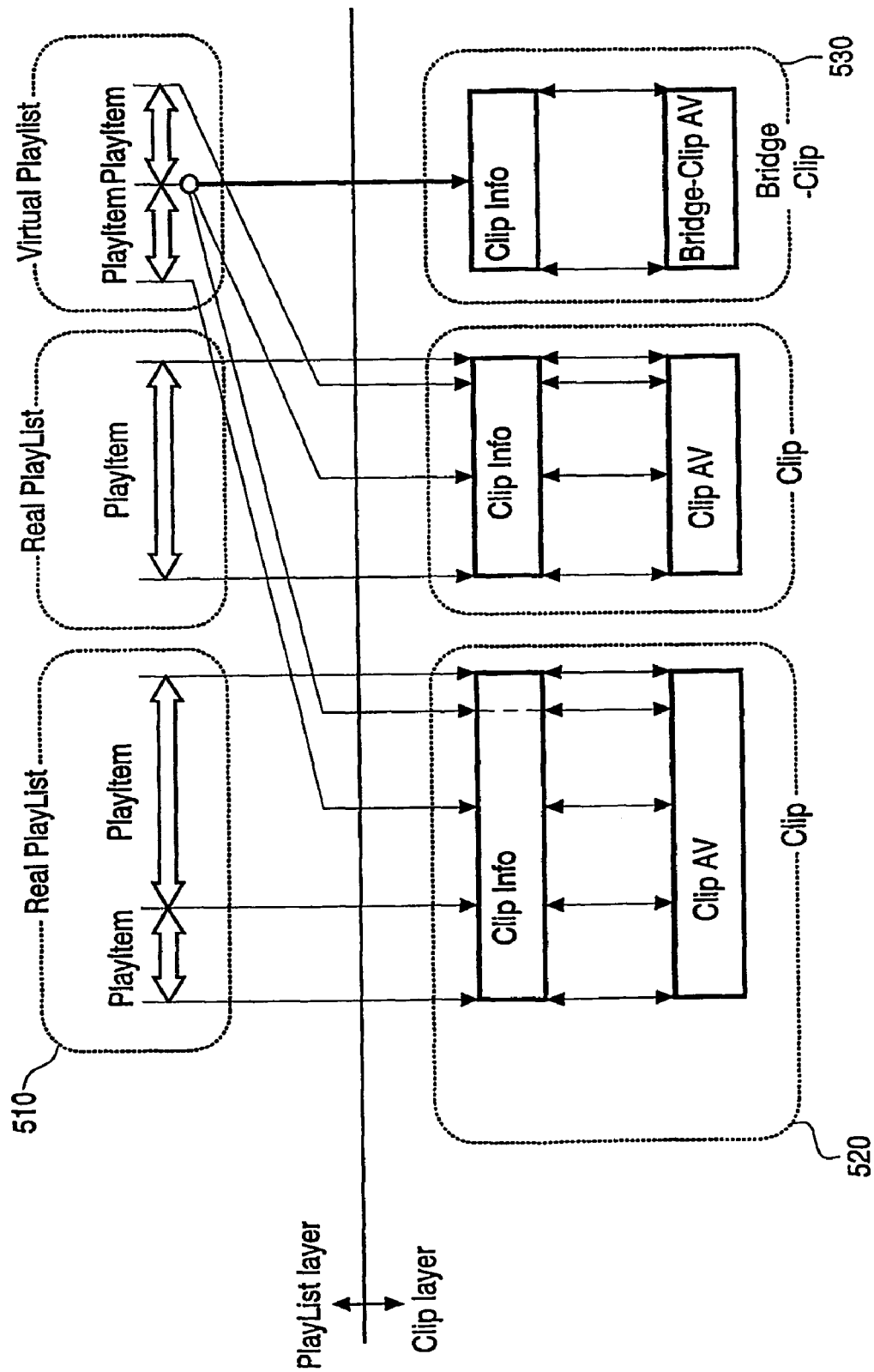

These and other aspects of the invention will be apparent from and elucidated further with reference to the embodiments described by way of example in the following description and with reference to the accompanying drawings, in which FIG. 1a shows a record carrier (top view), FIG. 1b shows a record carrier (cross section), FIG. 2 shows a recording device, FIG. 3 shows segments of recorded video having a physical error and a bridge segment, FIG. 4 shows segments of recorded video having a logical error and a bridge segment, and FIG. 5 shows playback information.

Corresponding elements in different Figures have identical reference numerals.

FIG. 1a shows a disc-shaped record carrier 11 having a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc, and has an information layer of a recordable type. Examples of a recordable disc are the CD-R and CD-RW, and writable versions of DVD, such as DVD+RW, and the high density writable optical disc using blue lasers, called Blue-ray Disc (BD). Further details about the DVD disc can be found in reference: *ECMA-267: 120 mm DVD—Read-Only Disc—* (1997). The information is represented on the information layer by recording optically detectable marks along the track, e.g. crystalline or amorphous marks in phase change material. The track 9 on the recordable type of record carrier is indicated by a pre-embossed track structure provided during manufacture of the blank record carrier. The track structure is constituted, for example, by a pregroove 14 which enables a read/write head to follow the track during scanning. The track structure comprises position information, e.g. addresses, for indication the location of units of information, usually called information blocks. The position information includes specific synchronizing marks for locating the start of such information blocks. The position information is encoded in frames of modulated wobbles as described below.

FIG. 1b is a cross-section taken along the line b-b of the record carrier 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The pregroove 14 may be implemented as an indentation or an elevation of the substrate 15 material, or as a material property deviating from its surroundings.

The record carrier 11 is intended for carrying information representing digitally encoded video according to a standardized format like MPEG2.

FIG. 2 shows a recording device for writing information on a record carrier 11 of a type which is writable or re-writable, for example CD-R or CD-RW, or DVD+RW or BD. The device is provided with recording means for scanning the track on the record carrier which means include a drive unit 21 for rotating the record carrier 11, ahead 22, a positioning unit 25 for coarsely positioning the head 22 in the radial direction on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. For writing information the radiation is controlled to create optically detectable marks in the recording layer. For reading the radiation reflected by the information layer is detected by a detector of a usual type, e.g. a four-quadrant diode, in the head 22 for generating a read signal and further detector signals including a tracking error and a focusing error signal for controlling said tracking and focusing actuators. The read signal is processed by read processing unit 30 of a usual type including a demodulator, deformatter and output unit to retrieve the information. Hence retrieving means for reading information include the drive unit 21, the head 22, the positioning unit 25 and the read processing unit 30. The device comprises write processing means for processing the input information to generate a write signal to drive the head 22, which means comprise an input unit 27, and modulator means comprising a formatter 28 and a modulator 29. The control unit 20 controls the recording and retrieving of information and may be arranged for receiving commands from a user or from a host computer. The control unit 20 is connected via control lines 26, e.g. a system bus, to said input unit 27, formatter 28 and modulator 29, to the read processing unit 30, and to the drive unit 21, and the positioning unit 25. The control unit 20 comprises control circuitry, for example a microprocessor, a program memory and control gates, for performing the procedures and functions according to the invention as described below. The control unit 20 may also be implemented as a state machine in logic circuits. The input unit 27 processes the audio and/or video to unit of information, which are passed to the formatter 28 for adding control data and formatting the data according to the recording format (as described below), e.g. by adding error correction codes (ECC) and/or interleaving. For computer applications units of information may be interfaced to the formatter 28 directly. The formatted data from the output of the formatter 28 is passed to the modulation unit 29, which comprises for example a channel coder, for generating a modulated signal which drives the head 22. Further the modulation unit 29 comprises synchronizing means for including synchronizing patterns in the modulated signal. The formatted units presented to the input of the modulation unit 29 comprise address information and are written to corresponding addressable locations on the record carrier under the control of control unit 20. The control unit 20 is arranged for recording and retrieving position data indicative of the position of the recorded information volumes. During the writing operation, marks representing the information are formed on the record carrier. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. Writing and reading of information for recording on optical disks and usable formatting, error correcting and channel coding rules are well-known in the art, e.g. from the CD system. The marks can be formed by means of the spot 23 generated on the recording layer via the beam 24 of electromagnetic radiation, usually from a laser diode. User video information is presented on the input unit 27, which may comprise of compression means for input signals such as analog audio and/or video, or digital uncompressed audio/video. Suitable compression means are described for audio in WO 98/16014-A1 (PHN 16452), and for video in the MPEG2 standard. The input signal may alternatively be already encoded.

MPEG is a video signal compression standard, established by the Moving Picture Experts Group ("MPEG") of the International Standardization Organization (ISO). MPEG is a multistage algorithm that integrates a number of well known data compression techniques into a single system. These include motion-compensated predictive coding, discrete cosine transform ("DCT"), adaptive quantization, and variable length coding ("VLC"). The main objective of MPEG is to remove redundancy which normally exists in the spatial domain (within a frame of video) as well as in the temporal domain (frame-to-frame), while allowing inter-frame compression and interleaved audio. MPEG-1 is defined in ISO/IEC 11172 and MPEG-2 is defined in ISO/IEC 13818. There are generally three different encoding formats which may be applied to video data Intra-coding produces an "I" block, designating a block of data where the encoding relies solely on information within a video frame where the macro block 16 of data is located. Inter-coding may produce either a "P" block or a "B" block. A "P" block designates a block of data where the encoding relies on a prediction based upon blocks of information found in a prior video frame (either an I-frame or a P-frame, hereinafter together referred to as "reference frame"). A "B" block is a block of data where the encoding relies on a prediction based upon blocks of data from at most two surrounding video frames, i.e., a prior reference frame and/or a subsequent reference frame of video data In principle, in between two reference frames (I-frame or P-frame) several frames can be coded as B-frames. However, since the temporal differences with the reference frames tend to increase if there are many frames in between (and consequently the coding size of a B-frame increases), in practice MPEG coding is used in such a way that in between reference frames only two B frames are used, each depending on the same two surrounding reference frames. To eliminate frame-to-frame redundancy, the displacement of moving objects in the video images is estimated for the P-frames and B-frames, and encoded into motion vectors representing such motion from frame to frame. An I-frame is a frame wherein all blocks are inter-coded. A P-frame is a frame wherein the blocks are inter-coded as P-blocks. A B-frame is a frame wherein the blocks are inter-coded as B-blocks. If no effective coding inter-coding is possible for all blocks of a frame, some blocks may be inter-coded as a P-block or even as an I-block. Similarly, some blocks of a P-frame may be coded as I-blocks.

The device comprises error detection means for detecting recording errors. The control unit 20 is arranged for detecting the recording errors in cooperation with the input unit 27, the read processing unit 30 or a write error detection unit 32. The device further comprises a bridging unit 31 for creating, in the event of a detected recording error, a bridge segment replacing the recorded video from an exit point in a segment before the detected recording error and an entry point in a segment after the recording error. The bridging unit 31 has an output 33 coupled to the formatter 28 for supplying the bridge segment video information to be recorded. The bridge unit 31 is arranged for selecting an exit point before the error location based on the type of encoding, e.g. exiting just before a new independently coded video frame (I picture). The first part of the bridge segment may contain a copy of some of the video information directly following the exit point, e.g. said I picture. Further the bridge unit 31 is arranged for selecting an entry point after the error location and also based on the type of encoding, e.g. just before an I picture. The last part of the bridge segment may contain a copy of some of the video information directly preceding the entry point. The bridge segment at least comprises an amount of video which is bridging the erroneous location, which usually requires some re-encoding, tans-coding or (re)creating time stamp information. A basic example is just creating a new sequence by gluing together existing GOPs which can still be recovered form the corrupt parts of the original data. Creating such bridging video information for a single video stream is similar to editing video for creating a seamless connection between different video streams as follows. The inter-frame coding, as for example described for MPEG, achieves an effective coding but causes problems when two or more A/V segments need to be joined in a seamless manner forming a combined segment. The problem particularly occurs where a P or B frame has been taken over into the combined sequence, but one of the frames on which it depends has not been taken over into the combined sequence. WO 00/00981 describes a data processing apparatus for and a method of frame accurate editing of encoded A/V sequences wherein frames in a segment bridging the first and second sequence of frames are created by fully recoding the original frames. The bridging segment includes all frames that have lost a reference frame because the original video MPEG video stream is interrupted. Further WO99/48096 (PHN 17350) describes a method for recording video information in fragments and creating bridging blocks for joining video streams of MPEG encoded video. In an embodiment the bridge segment is created taking into account the requirements of real-time performance defined for a standardized system, e.g. for BD a minimum length of a segment or other allocation rules as proposed in the documents above. This results in a predefined minimum real-time performance also when an error has to be overcome by including a bridge segment in the video stream.

In an embodiment of the device the control unit and the functions of error detection and bridge segment creation are implemented in a software program. The software program running in suitable computer environment is controlling the execution of the recording process in a disc drive unit which is connected to the computer, e.g. an optical disc recorder coupled via an interface bus or network to a PC.

FIG. 3 shows segments of recorded video having a physical error and a bridge segment. Schematically an encoded video signal 300 is shown as a series of segments 310 recorded along a track of the record carrier. At an error location 320 a physical error occurs, e.g. by a physical damaged part of the track no information can be recorded. The next segment 370 has been recorded normally. The error is detected and a bridge segment 360 is created and recorded at a different location. The control unit 20 is arranged for recording bridging playback information for controlling the playback to reproduce the encoded video up to an exit point 330 via the bridge segment 360 and continuing at an entry point 340. The playback control information is described below with reference to FIG. 5. Further the control unit 20 is arranged for recording the bridge segment 360 in a location in the track different from a location of the detected recording error. Hence a location is selected without deleting the originally recorded information, which also prevents the re-use of a physically erroneous part of the track.

In an embodiment of the device the error detection means comprise a write error detection unit 32 coupled to the read processing unit 30 via an error output 34 for detecting physical errors during writing information on the record carrier 11. The error detection unit 32 is coupled to the bridging unit 31. The read signals from the record carrier are monitored for detecting, during the writing process, a physical defect of the record carrier. Detecting such defects can be based on the reflected laser radiation during writing an optical disc, or on detecting deviations in other writing parameters. For example a read signal can be generated and errors occurring can be detected by the usual error correction codes (ECC) embedded in the data blocks recorded. In an embodiment the write error detection unit 32 is arranged for detecting physical errors by reading and processing defect information recorded earlier on the record carrier, e.g. defect tables managed by a disc management system like UDF. By analyzing the defect information the write error detection unit detects a physically erroneous location before it is actually written. Because the error is located in an early stage, the bridging segment can immediately be created and no video information is lost, provided a sufficient amount of buffer space is available. Further the disc drive does not need to enter its defect management procedure, which otherwise would be rather time consuming. Such a time consuming defect management procedure might result in a loss of real-time data.

In an embodiment the write error detection unit 32 is arranged for detecting writing errors resulting from incorrect recording data, e.g. missing data caused by buffer management errors or shocks during recording.

FIG. 4 shows segments of recorded video having a logical error and a bridge segment. Schematically an encoded video signal 400 is shown as a series of segments 410 recorded along a track of the record carrier. At an error location 420 a logical error occurs, e.g. by a missing part of video information in the input video stream. The next segment 470 has been recorded normally. The error is detected and a bridge segment 460 is created and recorded at a different location. The control unit 20 is arranged for recording bridging playback information for controlling the playback to reproduce the encoded video up to an exit point 430 via the bridge segment 460 and continuing at an entry point 440. The exit point 430 and the entry point 440 are located both in the same segment, and may be very close with this type of logical error, because the originally recorded information can be reproduced. The playback control information is described below with reference to FIG. 5.

In an embodiment of the device the error detection means comprise a video stream error detection unit 35 coupled to the input unit 27. The video stream which is send to the disc drive for recording is analyzed for errors, e.g. in the time information encoded in the Presentation Time Stamps (PTS) in an MPEG2 video stream. For example due to transmission errors of the input stream to the disc drive which is connected via a network, part of the transmitted video may be missing or corrupted. The error is detected and the control unit 20 is arranged for controlling the bridging unit 31 to create a bridging segment. The missing video frames may be replaced by interpolation of video frames that have been received before and/or after the interruption. In an embodiment the missing video frames are replaced by stuffing empty frames, e.g. repeating the last received frame during the interruption. By restoring the video stream to its original timing has the advantage that the user is less likely to detect the missing part, and that the audio stream can be continuous.

In an embodiment of the device the control unit 20 is arranged for performing a repair function for video information recorded earlier. The error detection means comprise a video stream error detection unit 36 coupled to the read processing unit 30. The video stream as recorded is reproduced, and logical errors are detected. A bridge segment is created and recorded as described above. The device may also comprise a physical read error detection unit 32, which is monitoring the quality of the read signal, e.g. by counting the number of errors occurring. As soon as the number of errors exceeds a predefined level, a bridge segment is created and recorded as described above.

FIG. 5 shows playback information. The playback information is shown in the upper part called playlist layer, while the video stream information is shown in the lower part called clip layer. A Playlist 510 is a collection of presentation intervals of video, which video stream is physically stored in a Clip 520. The Clip comprises Clip Info files which comprise control information for reproducing a continuous amount of video as recorded in a recording session, and the Clip AV files contain the video and audio information itself. For example the Clip Info file comprises address information about access points in the Clip AV file, usually on time stamp basis. In the playlist layer there is shown a first type of file structure, the Real Playlist, which controls the playback of a single recorded clip. The clip may be subdivided in the Playlist in a number of PlayItems defining the presentation intervals. There is no need that PlayItems are physically consecutive, e.g. commercials in a recorded video stream may be skipped by making them into unselected PlayItems. The Real Playlist is coupled directly to the corresponding Clip, e.g. if the Real playlist is deleted the Clip is also deleted, provided the clip is not linked to a Virtual playlist. The second type of file structure, the Virtual Playlist, is used to control playback of presentation intervals from several Clips, and/or from a Bridge-Clip 530, which is specifically created for making a seamless connection between when switching from a PlayItem in one Clip to a next PlayItem in a different Clip. According to the invention a detected error is prevented by creating a bridge segment as described above. In an embodiment the corresponding playback information is created in the form of a Virtual Playlist by defining a first PlayItem for the last segment preceding the error location up to the exit point, then a bridge clip item being the created bridge segment, and finally a PlayItem starting at the entry point up to the end of that segment. By creating the Virtual Playlist the user still has the option of reading the original data. For example a high quality drive may perform a recovery procedure by first attempting to read the original data, and only in the event that the original data is indeed corrupt reproduce the bridge segment. In an embodiment there is a bridge type indicator recorded on the record carrier, for example in the Playlist, which bridge type indicator indicates that the bridge segment has been formed for circumventing a corrupt part of the original data. Further specific characteristics of the error can be included in such indicator, e.g. the exact location and/or the number of blocks that are corrupt. In an embodiment a Real Playlist is created containing said three PlayItems. This has the advantage that the erroneous location in the originally recorded segments is not accessible any more, because the Real Playlist is the only access point to the recorded video, also when creating a further new Virtual Playlist during editing. Hence the Real Playlist with the bridge segment for bridging the erroneous location results in a clip which has no detectable errors. The original error is forever hidden by the bridge segment.

In an embodiment the error detection and bridging process can be controlled by a user. The user detects errors in the digitally encoded video information, for example glitches or artifacts in the displayed video stream. The device has a user command mode in which the user then indicates which part of the video must be marked as a recording error. The device then creates the bridge segment as described above.

Although the invention has been explained mainly by embodiments using the BD, similar embodiments like DVD are suitable for other optical recording systems. For example in the DVD+RW the playback information is organized according to the DVD standard as in said ECMA document, including Cells for logically reproducible items and VOBUs for physically stored video. Also for the information carrier an optical disc has been described, but other media, such as a magnetic disc or tape, may be used. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. A device for recording information in a track in a recordable area on a record carrier, said device comprising:
    recording means for recording marks representing the information; and
    control means
    for controlling recording by said recording means of digitally encoded video information in segments in the track and of playback information for controlling the playback of the segments, wherein said control means comprises:
    error detection means
    for detecting recording errors; and
    bridging means
    for creating, in the event of a detected recording error, a bridge segment replacing the recorded video between an exit point in a segment before the detected recording error and an entry point in a segment after the recording error,
    said control means controlling said recording means to record bridging playback information for controlling to reproduce the encoded video up to the exit point via the bridge segment and continuing at the entry point, and
    to record the bridge segment in a location in the track different from a location of the detected recording error,
    wherein the recording errors are logical errors in the digitally encoded video information, wherein the error detection means comprises means for detecting logical errors in the digitally encoded video information, and wherein the logical errors in the digitally encoded video information comprise discontinuities in time indicators included in a continuous stream of digitally encoded video information.

2. The device as claimed in claim 1, wherein the error detection means further comprises means for detecting a physical error during writing the information.

3. The device as claimed in claim 1, wherein the error detection means further comprises means for detecting a record carrier error by retrieving defect information from the record carrier, said defect information indicating locations of error-prone parts of the track.

4. The device as claimed in claim 1, wherein the error detection means further comprises means for receiving commands from a user for manually marking errors in the digitally encoded video information.

5. The device as claimed in claim 1, wherein the bridging means comprise stuffing means for including additional video frames in the bridge segment for a eliminating time discontinuity in the digitally encoded video information, said additional video frames being based on frames available in the digitally encoded video information before and/or after the time discontinuity.

6. The device as claimed in claim 1, wherein the bridging means comprises means for generating the bridging playback information in a real playlist, the real playlist being a control structure of playback information for controlling the playback of a linear sequence of segments.

7. The device as claimed in claim 1, wherein the bridging means generates a bridge type indicator, and the control means controls the recording means to record the bridge type indicator on the record carrier, said bridge type indicator indicating a type of the detected recording error.

8. A method of recording information, said method comprising the steps of:
   recording marks representing the information in a track in a recordable area on a record carrier;
   controlling recording of digitally encoded video information in segments in the track and of playback information for controlling the playback of the segments;
   detecting recording errors;
   creating, in the event of a detected recording error, a bridge segment replacing the recorded video between an exit point in a segment before the detected recording error and an entry point in a segment after the recording error;
   recording bridging playback information for controlling to reproduce the encoded video up to the exit point via the bridge segment and continuing at the entry point; and
   recording the bridge segment in a location in the track different from a location of the detected recording error,
   wherein the recording errors are logical errors in the digitally encoded video information, wherein the recording error detecting step comprises detecting logical errors in the digitally encoded video information, and wherein the logical errors in the digitally encoded video information comprise discontinuities in time indicators included in a continuous stream of digitally encoded video information.

9. A method of reading and recording information, said method comprising the steps of:
   reading digitally encoded video information in segments from a track in a recordable area on a record carrier;
   reading playback information for controlling the playback of the segments;
   detecting recording errors;
   creating, in the event of a detected recording error, a bridge segment replacing the recorded video between an exit point in a segment before the detected recording error and an entry point in a segment after the recording error;
   recording bridging playback information for controlling to reproduce the encoded video up to the exit point via the bridge segment and continuing at the entry point; and
   recording the bridge segment in a location in the track different from a location of the detected recording error,
   wherein the recording errors are logical errors in the digitally encoded video information, wherein the recording error detecting step comprises detecting logical errors in the digitally encoded video information, and wherein the logical errors in the digitally encoded video information comprise discontinuities in time indicators included in a continuous stream of digitally encoded video information.

10. A computer-readable readable medium having stored thereon a program for causing a processor on which the program is loaded to record information, said program being operative to cause a processor to perform the method as claimed in claim 8.

11. A computer-readable medium having stored thereon a program for causing a processor on which the program is loaded to read and record information, said program being operative to cause a processor to perform the method as claimed in claim 9.

* * * * *